(12) United States Patent
Cardenas

(10) Patent No.: US 8,377,278 B1
(45) Date of Patent: Feb. 19, 2013

(54) ELECTROKINETIC STRENGTH ENHANCEMENT OF CONCRETE

(75) Inventor: Henry E. Cardenas, Ruston, LA (US)

(73) Assignee: Louisiana Tech University Research Foundation; a division of Louisiana Tech University Foundation, Inc., Ruston, LA (US)

( * ) Notice: Subject to any disclaimer, the term of this patent is extended or adjusted under 35 U.S.C. 154(b) by 973 days.

(21) Appl. No.: 11/341,074

(22) Filed: Jan. 27, 2006

Related U.S. Application Data

(60) Provisional application No. 60/647,509, filed on Jan. 27, 2005.

(51) Int. Cl.
*G01N 27/447* (2006.01)
(52) U.S. Cl. .................................. 204/515; 204/450
(58) Field of Classification Search ................ 204/515, 204/450, 196.01–196.06, 196.37; 205/766, 205/734
See application file for complete search history.

(56) References Cited

U.S. PATENT DOCUMENTS

| | | | |
|---|---|---|---|
| 6,387,244 B1 * | 5/2002 | Lyublinski | 205/734 |
| 6,524,465 B1 * | 2/2003 | Ashida et al. | 205/687 |

FOREIGN PATENT DOCUMENTS

| | | | |
|---|---|---|---|
| JP | 10-120479 | * | 5/1998 |
| WO | WO 94/01380 | * | 1/1994 |

OTHER PUBLICATIONS

Sawada, S.; Page, C. L.; Page, M. M. Electrochemical injection of organic corrosion inhibitors into concrete, Corrosion Science, 2005, vol. 47, pp. 2063-2078.*

Yajun, J.; Cahyadi, J. H. Effects of densified silica fume on microstructure and compressive strength of blended cement pastes, Cement and Concrete Research, 2003, vol. 33, pp. 1543-1548.*

Vanifatova, N. G.; Spivakov, B. Y.; Mattusch, J.; Wennrich, R. Size separation of silica nanospheres by means of capillary zone electrophoresis, Talanta, 2003, vol. 59, pp. 345-353.*

Holloway, L.; Nairn, K.; Forsyth, M. Concentration monitoring and performance of a migratory corrosion inhibitor in steel-reinforced concrete, Cement and Concrete Research, 2004, vol. 34, pp. 1435-1440.*

Silica Fume document; accessed from the U.S. Dept. of Transportation Federal Highway Administration, http://web.archive.org/web/20010707083908/http://www.fhwa.dot.gov/infrastructure/materialsgrp/silica.htm.*

James K. Mitchell, Fundamentals of Soil Behavior, 2nd Edition, 1993 published by John Wiley & Sons, Inc., New York.

Partho Sarkar, Debnath De, Kimihiro Yamashita, Patrick S. Nicholson and Takao Umegaki, Mimicking Nanometer Atomic Process on a Micrometer Scale via Electrophoretic Deposition, Journal of the American Ceramic Society, vol. 83 No. 6, pp. 1399-1401, 2000.

C. Kaya, P.A. Trusty and C.B. Ponton, Preparation of Heterocoagulated Colloidal Suspensions for Fabrication of Ceramic Matrix Composites by Electrophoretic Filtration Deposition, British Ceramic Transactions, London, 1998 vol. 97, No. 2 (41-96), pp. 48-54.

Julie Will, Martin K. M. Hruschka, Lorenz Gubler and Ludwig J. Gauckler, Electrophoretic Deposition of Zirconia on Porous Anodic Substrates, Journal of the American Ceramic Society, vol. 84, No. 2, pp. 328-332, 2001.

(Continued)

*Primary Examiner* — Alex Noguerola
*Assistant Examiner* — Gurpreet Kaur
(74) *Attorney, Agent, or Firm* — Jones Walker Waechter Poitevent Carrere & Denegre, LLP

(57) ABSTRACT

A method and apparatus for strengthening cementitious concrete by placing a nanoparticle carrier liquid in contact with a first surface of a concrete section and inducing a current across the concrete section at sufficient magnitude and for sufficient time that nanoparticles in the nanoparticle carrier liquid migrate through a significant depth of the concrete section.

25 Claims, 4 Drawing Sheets

OTHER PUBLICATIONS

Reginald Thomas Gratwick, Dampness in Buildings, 2nd Edition, pp. 153-172, 1974 published by John Wiley & Sons, Inc., New York.

Nobuaki Otsuki, Makoto Hisada, Jae-Suk Ryu and Eiji Banshoya, Rehabilitation of Concrete Cracks by Electrodeposition, Mar. 1999, pp. 59-62.

V. Kasselouri, N. Kouloumbi and Th. Thomopoulos, Performance of Silica Fume-Calcium hydroxide mixture as a repair material, Cement and Concrete Composites vol. 23 No. 1, pp. 103-110, 2001.

Donggy Sohn and Thomas O. Mason, Electrically Induced Microstructural Changes in Portland Cement Pastes, Advanced Cement Based Materials, vol. 7, No. 3/4, April, pp. 81-88, May 1998.

Astrid Dietrich and Achim Neubrand, Effects of Particle Size and Molecular Weight of Polyethylenimine on Properties of Nanoparticulate Silicon Dispersions, Journal of the American Ceramic Society, vol. 84, No. 4, pp. 806-812, Apr. 2001.

Matthew L. Ifsher, Miroslav Colic, Masa P. Rao and Fred F. Lange, Effect of Silica Nanoparticle Size on the Stability of Alumina/Silica Suspensions, Journal of the American Ceramic Society, vol. 84, No. 4, pp. 713-718, 2001.

Duncan J. Shaw, Introduction to Colloid and Surface Chemistry, Fourth Edition, published by Butterworth-Heinemann, Oxford, pp. 174-297, 1992.

William C. Johnson, Cost-Effective Extraction of Chlorides from Bridge Steel, Journal of Protective Coatings & Linings, pp. 82-92, Jan. 1997.

E. Samson, J. Marchand and J.J. Beaudoin, Modeling the influence of chemical reactions on the mechanisms of ionic transport in porous materials an overview, Cement and Concrete Research, vol. 30, No. 12, pp. 1895-1902, 2000.

H.W. Reinhardt, Transport of Chemicals Through Concrete, Materials Science of Concrete III vol. 3, pp. 210-240, 1992.

A.M. Boddy, R.D. Hooton, M.D.A. Thomas, The Effect of Product Form of Silica Fume on its Ability to Control Alkali-Silica Reaction, Cement and Concrete Research, vol. 30, pp. 1139-1150, 2000.

Flavio, A. Rodrigues, Paulo J.M. Monteiro and Garrison Sposito, The Alkali-Silica Reaction, The Surface Charge Density of Silica and Its Effect on Expansive Pressure, Cement and Concrete Research, vol. 29, pp. 527-530, 1999.

Caijun Shi and Robert L. Day, Pozzolanic Reaction in the Presence of Chemical Activators Part II. Reaction Products and Mechanism, Cement and Concrete Research, vol. 30, pp. 607-613, 2000.

C.S. Poon, S.C. Kou, L.Lam, Z.S. Lin, Activation of Fly Ash/Cement Systems Using Calcium Sulfate Anhydrite ($CaSo_4$), Cement and Concrete Research, vol. 31, pp. 873-881, 2001.

V. Kasselouri, N. Kouloumbi and Th. Thomopoulos, Performance of Silica Fume-Calcium Hydroxide Mixture as a Repair Material, Cement and Concrete Composites, vol. 23, pp. 103-110, 2001.

M.I. Sanchez De Rojas, J. Rivera M. Frias, Influence of the Microsilica State on Pozzolanic Reaction Rate, Cement and Concrete Research, vol. 29, pp. 945-949, 1999.

K.O. Ampadu, K. Torii and M. Kawamura, Beneficial Effect of Fly Ash on Chloride Diffusivity of Hardened Cement Paste, Cement and Concrete Research vol. 29, pp. 585-590, 1999.

T. Bakharev, J.G. Sanjayan and Y.-B. Cheng, Effect of Admixtures on Properties of Alkali-Activated Slag Concrete, Cement and Concrete Research, vol. 30, pp. 1367-1374, 2000.

Sidney Diamond, Aspects of Concrete Porosity Revisited, Cement and Concrete Research, vol. 29, pp. 1181-1188, 1999.

Nataliya Hearn, R. Douglas Hooton and Ronald H. Mills, Pore Structure and Permeability, pp. 240-262.

P.W. Brown and Dex Shi, Porosity/Permeability Relationships, Materials Science of Concrete II, pp. 83-109.

Henry E. Cardenas, Investigation of Reactive Electrokinetic Processes for Permeability Reduction in Hardened Cement Paste, 2002.

Bakker, R.F.M., "Permeability of blended cement concretes", 1st International Conf. on the use of Fly Ash, Silica Fume, Slag and other Mineral by Products in Concrete, Montebello, Canada, ACI, 1983.

Bhanja, et al., Influence of Silica Fume on the tensile strength of concrete, Cement and Concrete Research, 2005, 35, pp. 743-747.

S. Micic, J.Q. Shang and K.Y.Lo; Electro-Cementation of a Marine Clay Induced by Electrokinetics; The International Society of Offshore and Polar Engineers; pp. 569-576; 2002.

* cited by examiner

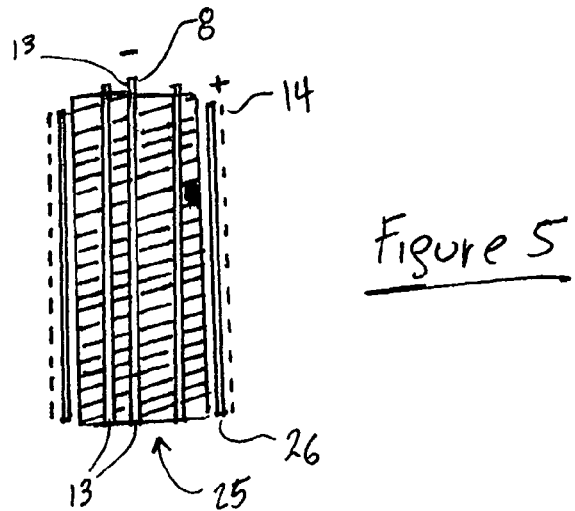
Figure 5
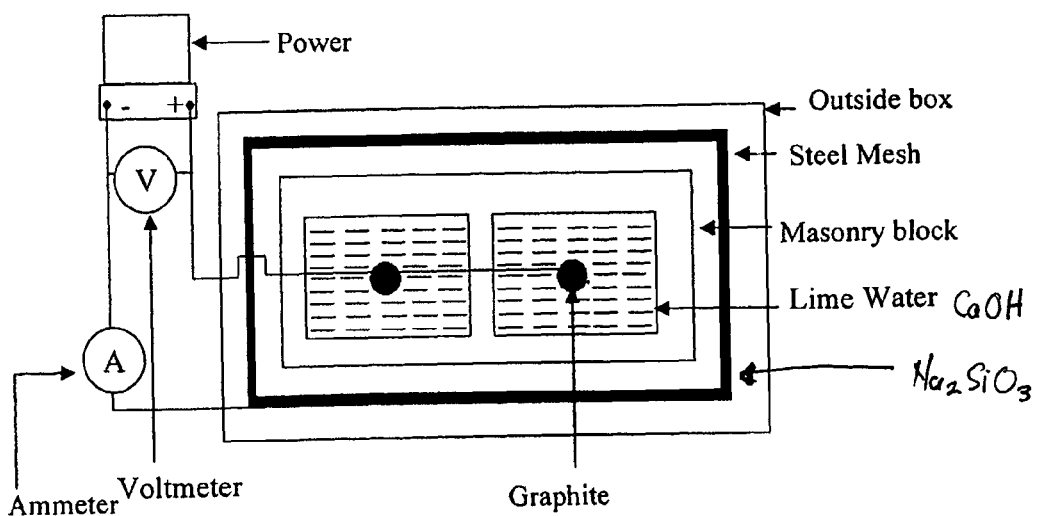
Figure 6. Top view of the block

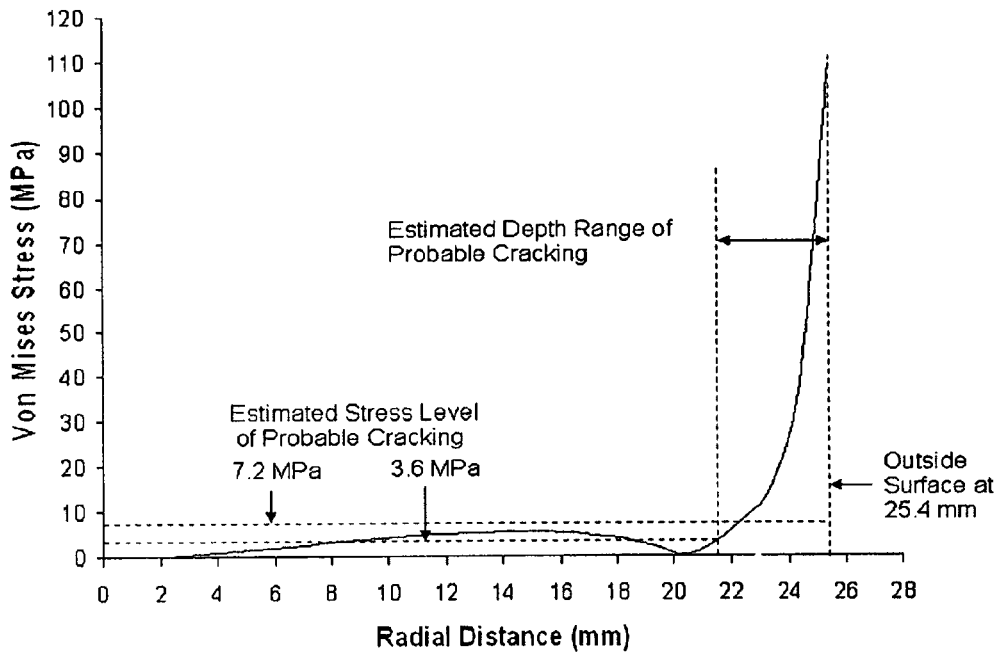
Figure 7 Von Mises Stress vs. Radial Distance Plot for Untreated Case
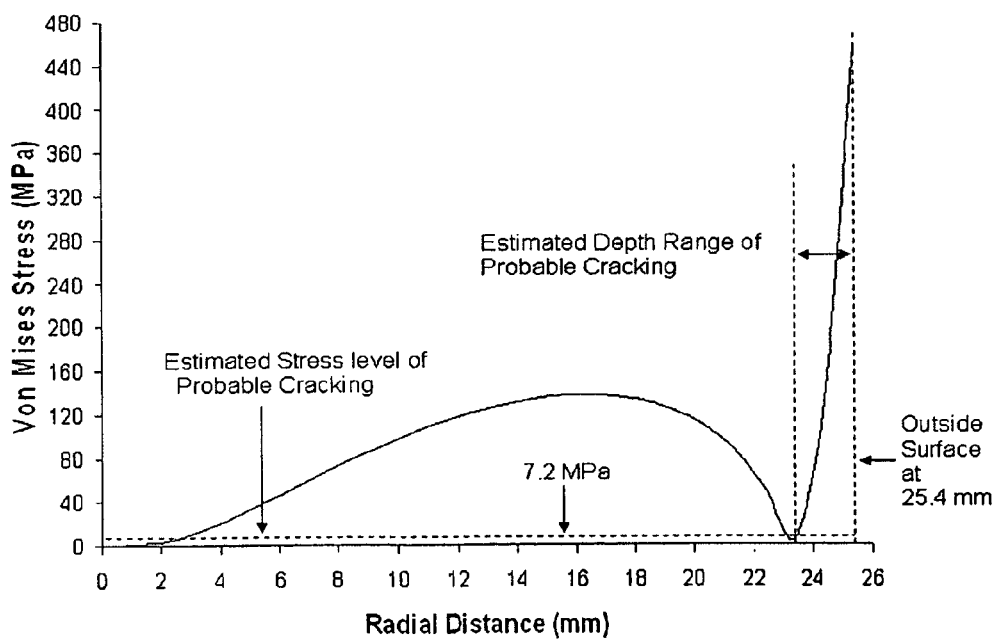
Figure 8 Von Mises Stress vs. Radial Distance Plot for Treated Case

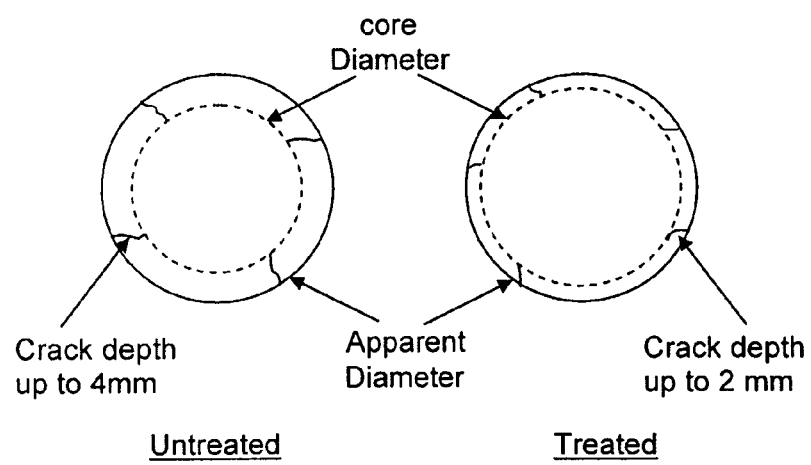
Figure 9 Crack Penetration for Untreated and Treated Specimens

ELECTROKINETIC STRENGTH ENHANCEMENT OF CONCRETE

This application claims the benefit under 35 U.S.C. 119(e) of U.S. provisional application Ser. No. 60/647,509 filed on Jan. 27, 2005.

This invention was developed in part with funds from contract NCC5-573-NASA/LEQSF(2004)-DART-10 awarded by NASA and the U.S. Government may have certain rights to the invention as provided by that contract.

FIELD OF INVENTION

The present invention relates to methods and apparatuses for improving the characteristics of concrete. One embodiment of the invention includes a method and apparatus for increasing the strength of concrete by using an electrical field to move particles into pores within the concrete.

BACKGROUND OF INVENTION

The movement of particles into porous materials such as concrete involve several processes, including adsorption, liquid diffusion, capillary absorbtion, bulk laminar flow, and electrokinetic transport. Electrokinetic transport is the phenomenon of charged particles moving in response to an applied electric field. Electrokinetic transport includes ionic conduction, electrophoresis, and electroosmosis. Ionic solution conductivity accounts for the overwhelming majority of conductivity measured in cement based materials. In an aqueous system (cement concrete structures generally retain a certain moisture content in most conditions), ions can be induced to drift in response to an applied electronic field. Electrophoresis is characterized by the movement of a solid particle dispersed in an electrolyte under the influence of an electric field. Electroosmosis is the induced flow of water through a porous medium such as sand, clay or concrete when an electric potential is applied across the medium.

Depending on the degree of saturation of a concrete sample, any or all of the above transport processes may occur and a number of structural factors may influence the transport processes. Concrete is a mixture of sand, stone (or other aggregate) flued together with a hardened cement paste that is porous. This pore structure is the dominant microstructural feature governing transport. Pore structure originates from the microstructure when water, anhydrous cement grains, and aggregate are mixed. Capillary pore structure initially assumes the shape of the space occupied by mix water. However, hydration of the cement yields calcium silicate hydrate (C—S—H) the primary binder in hardened cement paste. The capillary pore structure is developed as these hydration products form. Capillary pores tend to dominate transport processes and specific structural characteristics of capillary pores which influence transport include pore volume of the sample, size distribution, tortuosity, and connectivity. The aggregate present in the concrete may influence transport in different ways. Low porosity aggregate tends to impeded mass transport by blocking more direct paths through the hardened cement paste pores. Conversely, there can be high porosity at the paste-aggregate interfacial zones. Microcracks and bleed paths also influence particle transport. Microcracks form during drying of the calcium silicate hydrate layers which shrink and lead to tensile stress and cracking. Tensile stress do to plastic shrinkage, stresses from applied loads, thermal expansion or freezing pore water may also inducing microcracking. Bleed paths occur when prior to setting, water accumulates around aggregate and moves toward the surface of the cement paste. Discrete flows can join together to form bleed paths which remain after setting of the cement paste.

Changes in water content of hardened cement pastes have significant impacts on transport mechanisms and rates. At relative humidities above 45%, evaporable pore water is said to exist. Above this threshold, while the permeability of gases is increasingly blocked by liquid water barriers, the transport of aqueous ions or particles progresses more rapidly as the presence of evaporable capillary water increases. Thus, water content is an important factor affecting electrokinetic transport in concrete.

BRIEF DESCRIPTION OF INVENTION

Preferred embodiments of this invention include a method and apparatus for strengthening cementitious concrete by placing a nanoparticle carrier liquid in contact with at least a first surface of a concrete section and inducing a current across the concrete section at sufficient magnitude and for sufficient time that nanoparticles in the nanoparticle carrier liquid migrate through a significant depth of the concrete section. These particles react with calcium ions liberated from resident calcium hydroxide to form strong phases that increase the strength of the concrete.

BRIEF DESCRIPTION OF DRAWINGS

FIG. 5 illustrates a method to treat a column using one embodiment of the present invention.

FIG. 6 illustrates a masonry block treated by one embodiment of the present invention.

FIG. 7 illustrates a stress vs. radial distance plot for an untreated concrete section.

FIG. 8 illustrates a stress vs. radial distance plot for a treated concrete section.

FIG. 9 illustrates cross-section diagrams showing crack penetration.

DETAILED DESCRIPTION OF SELECTED EMBODIMENTS

Figure 1:
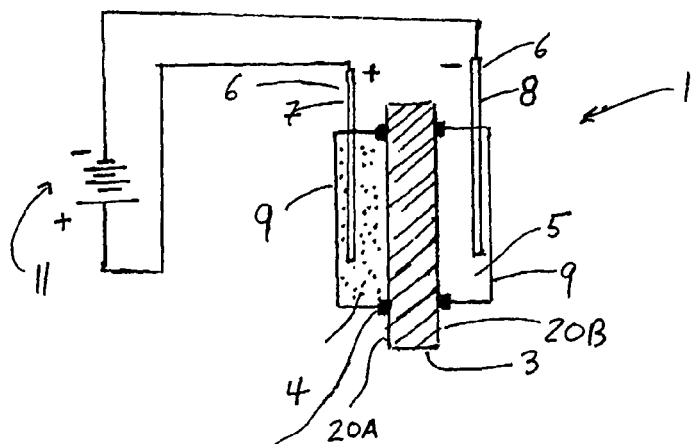
FIG. 1 illustrates one embodiment of the invention applied to a section of concrete material.

FIG. 1 illustrates one embodiment of the present invention, an apparatus 1 employed for increasing the strength of a concrete section 3. As seen in the cross-sectional view of FIG. 1, concrete section 3 will have two containers 9 positioned on opposing surfaces 20A and 20B. Containers 9 may be any substantially liquid impermeable enclosures which will retain a liquid while allowing the liquid to contact the respective concrete section surfaces 20A and 20B. Any type of conventional (or future developed) seal 10 may be employed along the edges where containers 9 contact surfaces 20A and 20B in order to prevent liquid from escaping containers 9 along such edges. The dimensions of containers 9 will generally be sufficient to substantially cover the surface area of concrete section 3 to be treated. Positioned within each container 9 will be an electrode 6 and a conductive liquid. The electrodes 6 will be connected to an electrical power source 11.

In the embodiment seen in FIG. 1, the left electrode 6 will be anode 7 and the right electrode 6 will be cathode 8. Likewise, the conductive liquid in the left container 9 will be a nanoparticle carrier liquid 4 and the conductive liquid in the right container 9 will be an electrolyte solution 5. In this embodiment, the nanoparticle carrier liquid 4 is a colloidal alumina suspension such as product no. 8676 provided by Nalco Chemical Corp. of Chicago, Ill., which comprises 10% by weight of 2 nm alumina particles in a chloride stabilized carrier liquid. The electrolyte solution 5 in this embodiment is a saturated calcium hydroxide $(CaOH)_2$ solution that is less than 1 molar. However, the nanoparticle carrier liquid 4 may any liquid containing particles which tend to strengthen concrete when moved into the pore spaces or microcracks existing in concrete. As used herein, nanoparticle generally means a particle that is less than 1 micron in size. A nanoparticle carrier liquid is generally a liquid containing a substantial percentage of nanoparticles, but such carrier liquids may also include some percentage of particles larger than 1 micron. In many embodiments, the nanoparticle carrier liquid will be a colloidal suspension carrying nanoparticles of compounds such as alumina, silica, sodium silicate, or other silicates and aluminates. Other embodiments may include nanoparticles of latex, or polymer particles. However, the carrier liquid is not necessarily limited to suspensions and solutions since vapors and air could be could be carrier fluids. Typical weight percent concentrations of nanoparticles could be about 1 to about 60 weight percent, about 10 to about 50 weight percent, about 30 to about 50 weight percent, or any range between 1 and 60 weight percent. Likewise, electrolyte solution 5 could be any number of conductive suspensions or solutions such as calcium hydroxide, tap water, rain water, and pure water that has been allowed to absorb conductive ions from its surroundings (e.g., water in contact with the concrete). However, electrolyte solutions containing aggressive species such as chlorides or sulfates are not typically preferred.

Electrodes 6 may be formed of any material which is sufficiently conductive to carry out the functions of the present invention. Exemplary electrode materials include zinc, cadmium, steel, aluminum, copper, monel, or other conductive metals or conductive-oxide-coated versions of these metals. Post-tensioned steel and other applications that may be susceptible to hydrogen embrittlement hazards are less preferred for Electrodes 6. In many embodiments, it is advantageous to form the anode 7 from a relatively corrosion resistant but conductive material such as graphite, a conductive polymer, or a mixed-metal-oxide titanium alloy.

In the embodiment of FIG. 1, the conductive liquids in containers 9 act to provide a uniform electric field across the portion of surfaces 20A and 20B which are in contact with the liquids. The electric field will induce movement of charged particles in the carrier liquid toward the electrode having the opposite charge of the particle and thus into the concrete section 3. Many factors affect the velocity at which particles move into and within the concrete, including the particle size, particle charge, pore fluid ion concentration, pore wall and particle zeta potential, pore fluid viscosity, electroosmotic coefficient of permeability, fluid pressure acting in opposition to particle transport, thickness of concrete, the size and number of micro-cracks, the porosity (both pore volume and tortuosity) of the concrete, the moisture content of the concrete and the strength of the electric field. If the electric field strength is stated in terms of current density, it may vary from as little as 10 mA/ft$^2$ (or less) to more than 1000 mA/ft$^2$. The time necessary for nanoparticles to disperse though the entire thickness of concrete section 6 is of course based upon the thickness of the section and the nanoparticle velocity.

As mentioned above, one nanoparticle carrier is colloidal alumina. Alumina may be consider a "pozzolan," which may be defined as a siliceous, aluminous or siliceous and aluminous material which in itself possesses little or no cementing property, but will in a finely divided form and in the presence of moisture chemically react with calcium hydroxide at ordinary temperatures to form compounds possessing cementitious properties. In regards to alumina, a pozzolanic reaction, may be described as the aluminous pozzolans reacting with the (non-cementitious) calcium hydroxide in the hydrated cement paste to produce (highly cementitous) calcium aluminate hydrates which yield higher strength and dramatically reduced the permeability of the concrete. This reaction may be represented by the formula:

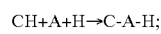

where CH is $Ca(OH)_2$, A is $Al_2O_3$, H is $H_2O$, and C-A-H is calcium aluminate hydrate. Where the pozzolan is silica, a similar pozzolanic reaction may be described as:

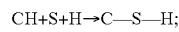

where S is $SiO_2$ and C—S—H is calcium silicate hydrate.

Sodium silicate may be another nanoparticle suspension utilized in certain embodiments of the present invention. Sodium silicate is any one of several compounds containing sodium oxide, $Na_2O$, and silica, $Si_2O$, or a mixture of sodium silicates with varying ratios of $SiO_2$ to $Na_2O$, solids contents, and viscosity. Traditionally, sodium silicates are classified according to the acid from which they are derived as Orthosilicate $Na_4SiO_4$; Metasilicate $Na_2SiO_3$; Disilicate $Na_2Si_2O_5$; Tetrasilicate $Na_2Si_4O_9$. The sodium silicate species can change from one type to another depending upon conditions and the relative concentrations of each one that is present. This process may provide more of the actual species undergoing the reaction. Sodium silicate (in the case of Metasilicate) enters pores and combines with calcium hydroxide to form C—S—H gel as follows:

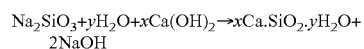

As used herein, "nanoparticle carrier liquid" includes (but is not limited to) any liquid containing nanoparticles (including ions) in suspension, solution, or dissolved, which react with other components to form strong phases to increase the strength of concrete. In certain embodiments, the nanoparticles will be particles or ions which react with calcium hydroxide (either resident in or driven into the concrete) in order to form this stronger phase.

In addition to pozzolans combining with calcium hydroxide originating in the cement section itself, certain embodiments of the present invention employ $Ca(OH)_2$ in the electrolyte solution 5 to increase the availability of $Ca^{++}$ ions. For example, if colloidal silica is the nanoparticle carrier 4 in FIG. 1, it will be understood that locations of anode 7 and cathode 8 would be reversed in order to move the negatively charged silica particles into concrete section 3. Likewise, the positive $Ca^{++}$ ions in the electrolyte solution 5 would be moved into concrete section 3, where such $Ca^{++}$ would be available for the pozzolanic reaction described above. Although this polarity arrangement may tend to remove $OH^-$ ions from the concrete, the abundance of $OH^-$ in the concrete means any resulting removal of $OH^-$ is inconsequential to the overall treatment process.

Although FIG. 1 suggests containers 9 are enclosed (i.e., additional liquid is not shown being added), this need not always be the case. In some embodiments, the volume of nanoparticle liquid in container 9 will have sufficient nanoparticles to completely treat the concrete section 3. However in other embodiments, additional nanoparticle carrier liquid may be fed into container 9 (i.e., exchanged with the depleted carrier liquid) if a greater mass of nanoparticles is needed for complete treatment.

Figure 2:
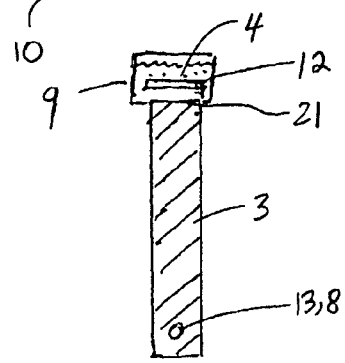
FIG. 2 illustrates another embodiment of the invention wherein the rebar serves as an electrode.

Alternate embodiments of present invention applying similar electrokinetic transport principles as described above may be seen in FIGS. 2-5. FIG. 2 represents a concrete section 3 having reinforcing steel or "rebar" 13. A container 9 will be formed around one end of concrete section 3 such that the nanoparticle carrier liquid 4 is in contact with the surface 21. A wire, mesh, or flat plate electrode 12 will be positioned in the nanoparticle carrier liquid 4 and will extend substantially the length of concrete section 3 (i.e., the length running perpendicular to the cross-sectional plane shown in FIG. 2). In this embodiment, the rebar 13 will be connected to current source and serve as an electrode (e.g., cathode 8). When plate electrode 12 forms the anode and rebar 13 forms the cathode, positively charged nanoparticles (e.g., alumina) in carrier liquid 4 will be driven toward rebar 13 by the electric field established between the electrodes. Clearly, the distance which must be traveled by the nanoparticles is greater in FIG. 2 than FIG. 1, thereby suggesting the use of a higher current density or a longer treatment duration than might be necessary for the arrangement of FIG. 1.

Figure 3:
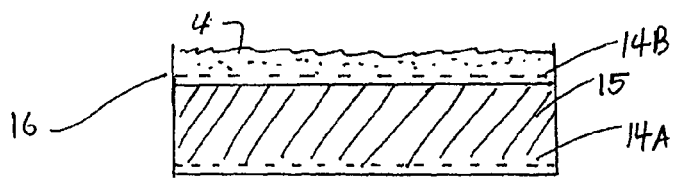
FIG. 3 illustrates an embodiment of the invention applied to uncured concrete.

Although the embodiments of FIGS. 1 and 2 contemplate the treatment of a rigid cured concrete section 3, FIG. 3 illustrates an alternate embodiment could be employed to treat an uncured concrete section 15. A form 16 will be provided which, as is well know in conventional concrete production, will contain the uncured flowable concrete mix in the intended shape of the ultimate concrete section. The sides of form 16 will be higher than the depth of the concrete section in order to accommodate a fluid (explained below) overlying the placed concrete mix. A wire mesh electrode 14A will be positioned in the bottom of form 16 prior to the pouring of any concrete mix. Wire mesh electrode 14A can be of various types of mesh, preferably with a large enough opening to allow water to pass readily through and a small enough opening to ensure the distribution of a uniform electric field across the substrate. In one embodiment, a mesh with a 1/16 inch opening size may be placed in direct contact with the surface. In another embodiment, a large mesh with and opening size of 12 inches may be located 6 inches from the concrete surface. Such meshes will generally conform to the bottom dimensions (width and length) of the form 16. However, alternate embodiments of wire mesh electrode 14A could be greater or less than the bottom dimensions of form 16. Likewise, in other embodiments not specifically illustrated, rather than a mesh electrode, a conductive plate could be positioned in the bottom of form 16. Alternatively, any reinforcing steel intended for use in the concrete section 15 could serve as the electrode. After placement of electrode 14A, a conventional cement paste mix (e.g., water, cement, course and fine aggregate) will be placed in form 16 in an amount sufficient to produce the desired thickness of the concrete section. Optionally, the mix design may be adjusted with more water and less cement powder to optimize cost. A second mesh electrode 14B is spaced over the top of the uncured cement mix. In the embodiment shown, the mesh electrode 14B will be spaced slightly above (e.g. at least 0.5 cm) the top of the placed concrete mix. However, in other embodiments, the mesh can also be touching the concrete or be positioned just beneath the concrete surface. A nanoparticle carrier liquid 4 is then carefully introduced onto the concrete mix in a manner that does not disturb the concrete mix and in an amount sufficient to immerse the mesh electrode 14B, assuming it is not cast in. Thereafter, an electric current is applied between the electrodes 14A and 14B in order to induce the migration of nanoparticles through the concrete section. In the embodiment shown, a current density of about 10 mA/ft$^2$ to about 1000 mA/ft$^2$ could be employed (although current densities outside this range are possible) and in one particular example, the current density would be about 500 mA/ft$^2$. The duration of current application will depend on factors such as the desired depth to which nanoparticles are being directed, the magnitude of the current density, and the water content of the cement mix. In many embodiments, the duration should be sufficient to move particles into all the locations that are subject to the electric field, since application of an electric field to the concrete without nanoparticle strengthening may result in a weakening of the portion of the concrete. If the treatment occurs over several days, the concrete may be more than sufficiently cured to remove from form 16 and pull wire mesh 14A from the bottom of the concrete section. Although the method of FIG. 3 has been described as being initiated with uncured concrete mix, the method could be applied to any hardened cement paste (i.e., the concrete having reached the binder phase that holds all the stone and sand in a fixed matrix).

Figure 4:
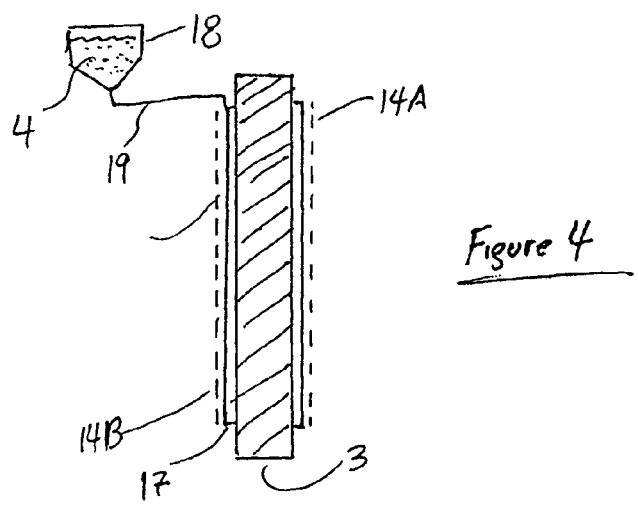
FIG. 4 illustrates an embodiment of the invention employing a sponge material to assist in bringing particles into wet electrical contact with the concrete surface.

A further embodiment seen in FIG. 4 utilizes a different method for placing the nanoparticle carrier liquid into contact with the concrete section 3 (a cured concrete section in the example of FIG. 4). Placed against at least one surface of concrete section 3 will be a flexible porous material 17 which is capable of at least partially absorbing and retaining a nanoparticle carrier liquid brought into contact with the flexible porous material 17. In one example, flexible porous material 17 is a sponge material. Such sponge materials could include natural sponges, e.g., an elastic porous mass of interlacing horny fibers that forms the internal skeleton of various marine animals and is able when wetted to absorb water; or synthetic sponges, e.g., a porous rubber or cellulose product having properties similar to a natural sponge. Flexible porous material 17 will typically cover the general area of concrete section 3 into which nanoparticles are to be introduced. The thickness of flexible porous material 17 may vary in different embodiments. In one example, flexible porous material 17 may be approximately 2.5-7.6 cm thick. However, in other embodiments, the porous material need only be thick and flexible enough to accommodate most of the surface topography of the substrate being treated so that wet electrical contact is maintained during treatment. FIG. 4 also illustrates a reservoir 18 of nanoparticle carrier liquid 4 which communicates with flexible porous material 17 via supply line 19. The transfer of fluid could be accomplished through a gravity feed system as suggested in FIG. 4 or though some type of pumping arrangement. Reservoir 18 will replenish the nanoparticle carrier liquid 4 in flexible porous material 17 as the liquid evaporates and as nanoparticles are driven from flexible porous material 17 into concrete section 3. A mesh electrode 14B will be positioned over flexible porous material 17. On the surface of concrete section 3 opposite mesh electrode 14B, another flexible porous material will be positioned to bring an electrolyte solution into wet electrical contact with that surface of concrete section 3. The mesh electrode 14A will be positioned on the flexible porous material. Although not explicitly shown in FIG. 4, certain embodiments could include a reservoir of electrolyte solution to supply the flexible porous material 17. Likewise, the porous material could be positioned under a mesh electrode of conductive fabric, e.g., a fabric containing a weave of flexible graphic wire. As in the embodiments described in FIGS. 1-3, application of a current between mesh electrodes 14A and 14B at a sufficient magnitude and for sufficient duration will induce nanoparticles to move into and through at least a significant portion and preferably the entire depth of the concrete section 3.

Many variations of the method seen in FIG. 4 are within the scope of the present invention. The material 17 need not be flexible and there may be applications where a comparatively rigid porous material may be employed. Additionally, it may not always be necessary to have the material 17 re-supplied with liquids from some external source such as reservoir 18. Rather, in certain applications it may suffice to simply expose material 17 to nanoparticle and electrolyte liquids at the initial stage of the treatment process and this will provide sufficient nanoparticles for the complete treatment of the concrete section. Alternatively, material 17 could be refreshed with liquids at one or two points in the treatment process (as opposed to continuous supply from a reservoir). Although FIG. 4 illustrates separate mesh electrodes 14A and 14B positioned over porous material 17, other embodiments might include metal fibers (or other conductive materials) incorporated into porous material 17, thereby combining the liquid retaining function and the electrode function into a single section of material. Likewise, if rebar is present in the concrete section 3 (for example near the side on which mesh electrode 14A rests), then the rebar may substitute for electrode 14A (and eliminate the need for porous material 17 under electrode 14A). Also, porous material 17 could be applied to an uncure concrete mix to replace the pool of carrier liquid described in the embodiment of FIG. 3.

FIG. 5 illustrates another embodiment using a porous material to retain a nanoparticle carrier liquid in contact with a concrete section. In the cross-sectional view of FIG. 5, the concrete section is a concrete column section 25. As is typical with concrete columns, column section 25 will include a series of rebar members 15. In FIG. 5, a continuous section of porous material 26 is wrapped around column section 25 and a mesh electrode 14 is either intermeshed or positioned atop porous material 26. In this embodiment, one or more of rebar members 13 will act as the electrode 8. Typically, the center most rebar member(s) 13 will act as electrode(s) 8 in order to move nanoparticles as far as possible toward the center of column section 25 (i.e., nanoparticles are not expected to migrate any further inward than the most central rebar position of electrode 8). Although not shown, a nanoparticle carrier liquid reservoir could be connected to porous material 26. Additionally, porous material 26 need not be continuous around the circumference of the column, but could be placed in discrete sections to cover a substantial portion of the column's circumference (with the same being true for mesh electrode 14).

The foregoing specification has described only a few specific embodiments of the present invention and those skilled in the art will recognize many alternatives and variations. As suggested above, it is not necessary in every embodiment to treat (i.e., disperse nanoparticles into) the entire depth of the concrete section. However, in some situations, application of a substantial current density across a concrete section may result in weaker concrete in those portions into which nanoparticles do not extend. Additionally, when dealing with concrete sections which have become quite dry (at least on the outer inch or two of the concrete surface), it may be advantageous to thoroughly wet the concrete surface prior to beginning the electrokinetic treatment. Nor is the present invention limited to applying the nanoparticles in the methods described in FIGS. 1-5. For example, it is envisioned that the nanoparticle carrier liquid could be a thick viscous liquid with a consistency similar to paint. The carrier liquid would then be "painted" onto the surface of the concrete section with an electrode (e.g., a mesh electrode) placed directly on the painted section of the cement. Alternatively, particles could be used that are transported through the air using a powder coating wand. The substrate would preferably be wet so that particles that absorb onto the wall could continue to migrate in the electric field. Another alternative could involve the use of a conductive gel. The gel would be loaded with particles, applied to the concrete substrate and driven into the concrete using and an electrode immersed in the gel, or the substrate. The gel may be vacuumed and recycled for a future application. All such variations and modifications should be considered within the scope of the claims.

EXAMPLES

Example 1

Tests were conducted to determine the impact of the electrokinetic treatment on common heavy weight and light weight masonry blocks. A heavy weight block is a hollow load-bearing concrete block 8-by-8-by-16-inches nominal size, having two hollow sections, and weighing from 40 to 50 pounds when made with heavyweight aggregate, such as sand, gravel, crushed stone, or air-cooled slag. The same size block is considered light weight and weighs only 25 to 35 pounds when made with coal cinders, expanded shale, clay, slag, volcanic cinders, or pumice. The masonry blocks were obtained from American Block Corporation of Bossier City, La. in July 2004. The light weight blocks were treated and tested seven months following production. The heavy weight blocks were treated and tested 16 months following production. Prior to treatment the masonry blocks were fully saturated in a solution of 1 molar calcium hydroxide. The electrokinetic treatment was carried out for a period of five days.

The heavy weight and the light weight masonry blocks were stabilized in saturated calcium hydroxide solution until a time when the difference in weight of the masonry blocks on two consecutive days showed an increase of less than 0.2% (in accordance with ASTM C 140). This was done to ensure that the specimens were fully saturated during the five-day treatment period. Saturation was established to minimize absorption of chemicals through capillary draw. Allowing capillary draw would permit a change in weight that would not be due to electrokinetic treatment. A lack of saturation could also reduce treatment access to the pore structure and thus reduce the enhancement of load resistance and permeability reduction that would otherwise be available. Electrokinetic treatment does not penetrate well into unsaturated spaces. This lack of penetration could reduce the enhancement of load resistance or permeability reduction that could be obtained. In each case the masonry blocks were successfully stabilized within approximately 13-19 days.

Following moisture stabilization the specimens were prepared for a five-day treatment period as suggested in FIG. 6. Window putty was used as a fluid barrier at the bottom of each specimen so that when the sodium silicate (Oxychem 50, 44 wt-% $Na_2SiO_3$) and calcium hydroxide solutions were placed (see FIG. 6), this seal prevented the flow of liquid beneath the block. This allowed enough time for staging the experiment without premature mixture of the reactants. The negative pole of the power supply was connected to the steel mesh that was immersed in the sodium silicate. The positive pole was connected to the graphite electrodes immersed in calcium hydroxide solution. The compression test was conducted according to ASTM C 140 specifications to determine the load resistance of the specimens and for calculating the percentage increase in load resistance after treatment.

The light weight block specimens were labeled as follows:
Set 1 contains Experimental Block 1 (LEB1) and Control Block 1 (LCB1),
Set 2 contains Experimental Block 2 (LEB2) and Control Block 2 (LCB2), and
Set 3 contains Experimental Block 3 (LEB3) and Control Block 3 (LCB3).
The heavy weight block specimens were labeled as follows:
Set 1 contains Experimental Block 1 (HEB1) and Control Block 1 (HCB1),
Set 2 contains Experimental Block 2 (HEB2) and Control Block 2 (HCB2), and
Set 3 contains Experimental Block 3 (HEB3) and Control Block 3 (HCB3).

The treatment circuit was set for constant voltage. For the light weight specimens a current of 38 mA was applied for Set 1 and a current of 76 mA was applied for Set 2 and Set 3. The heavy weight blocks were all treated with a current of 76 mA. Some current and voltage drift was observed and was mainly due to electrode polarization. In addition, the loss of ions due to the C—S—H reaction caused resistance to go up and thus an increase in voltage. Current and voltage readings were taken every 24 hrs before and after adjusting the current reading back to the original value.

The five-day electrokinetic treatment period was conducted with a constant voltage application. Small drifts in the applied current required daily voltage adjustments. These adjustments tended to be large due to the high resistance of the circuit. The current for most part remained stable. As a result, the circuit parameters showed an increase voltage over time. The expectation is that the voltage requirement should go up significantly as the reaction progresses. In general electrode polarization tends to cause current drop. In this case, the ongoing reaction removes ions and nanoparticles from solution. These ions are the carriers of the electric current. They react and no longer remain as ions as the reaction progresses. This causes resistance to drop, leading to an increase in voltage.

The maximum compressive load test was conducted to determine the change in the load resistance of the block after the treatment. The impact on load resistance in each Set of blocks is also shown in Table 1.

TABLE 1

Compression test.

| Light Weight Specimen | | | Heavy Weight Specimen | | |
| --- | --- | --- | --- | --- | --- |
| Specimen | Failure Load (lbs) | Increase in Load Resistance (%) | Specimen | Failure Load (lbs) | Increase in Load Resistance (%) |
| LCB1 | 7200 | 119 | HCB1 | 13600 | 101 |
| LEB1 | 15800 | | HEB1 | 27400 | |
| LCB2 | 9900 | 134 | HCB2 | 14800 | 105 |
| LEB2 | 23200 | | HEB2 | 30300 | |
| LCB3 | 9600 | 138 | HCB3 | 16100 | 110 |
| LEB3 | 22800 | | HEB3 | 33800 | |

The percentage of increase in load resistance in light weight blocks was greatest for specimen LEB3 with a value of 138% as compared to 134% for specimen LEB2 and 119% for specimen LEB1. The average increase in load resistance among the light weight blocks was 130%. The maximum increase in load resistance in heavy weight blocks was observed in specimen HEB3 with an increase of 110%. The average increase in load resistance for the heavy weight blocks was 109%.

Current was supplied at the density of 9 mA/m$^2$ in order to minimize damage to the blocks. For a treatment surface area of 0.24 m$^2$ the resultant current was 38 mA. This was the applied current for specimen LEB1. It was later taken into account that the masonry blocks could be treated with double the current density since the particles tended to heal the damage from the current. This observation enabled the use of a current of 76 mA for blocks from Set 2 and Set 3. This healing assumption was demonstrated by the compressive load resistance observed. The load resistance increase in light weight blocks was higher for specimens LEB2 and LEB3 with an average increase of 136% as compared to a 119% increase for specimen LEB1. This demonstrated a difference of only 19%. This behavior also suggests that the different current densities did not produce a significant difference in result and that five days may not be required to achieve a given level of block performance.

There was a significant enhancement in the load resistance due to treatment especially in view of the largeness and the structure of the masonry block. The average enhancement in load resistance was increased by 130% for light weight blocks and by 109% for heavy weight blocks. (Refer to Table 1). A possible reason why this large effect was not fully expected is because the defect probability of a system increases with the sample size. For systems of smaller size the effect of strengthening would be expected to exhibit better results since the defect probability would likely be relatively low.

Visual inspection showed that the fracture surface of the masonry structure exhibited a white precipitate at various locations over the surface. This formation indicated the presence of a treatment product (probably C—S—H). This product appears to be associated with the decrease in permeability and the enhancement in load resistance observed in this study.

A very close observation of Table 1 indicates that the average load resistance of the treated light weight block was 39% greater than the untreated heavy weight block. This demonstrates that the load resistance of the heavy weight block was exceeded by electrokinetic treatment of the light weight block. This indicates that the treated light weight block could be used in place of the heavy weight block, which is generally 20% greater in mass.

It is also noteworthy that there was a significant reduction in the permeability of the blocks. The average reduction in permeability for all the treated light weight blocks was 900%. The maximum reduction in permeability for light weight blocks was observed in Set 2 with a reduction of 1600%. For the heavy weight blocks the maximum reduction in permeability was for Set 3 with 3000% and the average reduction for all treated blocks was 2200%. It is clear from these results that the mixture of ions and suspended silica particles in sodium silicate reacted sufficiently with calcium hydroxide to block the pores of the masonry block thereby bringing about a significant reduction in permeability.

Example 2

Thermal shock is a severe condition that military aircraft pavements experience. Normal strength concrete loses 10-20% of its original compressive strength when the temperature is increased to 300° C. It can lose up to 60% of its strength when heated to 600° C. To address this problem, specimens were tested that consisted of mixtures of Type I Portland cement. Cylindrically shaped specimens were made from Portland cement paste and cast into polyethylene vials. The specimens were 50.8 mm in diameter and 50.8 mm in height. Nanoparticle treatment commenced immediately following batching. Two batches of specimens were made with water/cement (w/c) ratios of 0.4, and 0.5. The Type I Portland cement was manufacture by Lonestar Industries Inc. An electrokinetic drive circuit was connected similar to that shown in FIG. 3. Three specimens from each batch of nine were treated electrokinetically with 2 nm colloidal alumina nanoparticles for 14 days. The colloidal alumina was poured gently at the top of each Portland cement specimen. This pond was replenished daily. The current was set to provide a current density of 1.1 A/m$^2$. The power supply was set in current control mode. During this period, control specimens were stored in limewater. After 14 days, both the treated and control specimens were placed in a furnace and heated for 36 hrs at 550° F. (288° C.). The specimens were removed from the furnace and water quenched. After quenching, the specimens were capped with a sulfur capping compound. These specimens were tested in compression.

Cracks appeared on both the treated and untreated specimens after quenching following a thermal exposure at 550° F. (288° C.) for 36 hours. Compressive tests were conducted on specimens in accordance with ASTM standard C150 in the following categories.
1) Non treated and unheated,
2) Non treated and oven tested, and
3) Treated and oven tested specimens.

The strength values are presented in Table 2. These values provide a comparison of the above mentioned cases for the 0.4 and 0.5 w/c ratios. The load application time in each case was 70 s. Each value represents an average of three specimens. It was observed that the unheated controls were stronger than the specimens that were heated and quenched. The specimens that were nanoparticle treated prior to heating and quenching were stronger than the untreated cases as well as the controls.

TABLE 2

Compressive Strength Test Values

| Treatment | Failure Stress for 0.5-w/c Specimens (MPa) | Failure Stress for 0.4-w/c Specimens (MPa) |
|---|---|---|
| Untreated and Unheated Controls | 15.7 | 16.2 |
| Untreated and Heated | 11.7 | 12.5 |
| Treated and Heated | 16.4 | 27 |

Quenching produced cracks on all the specimens. For this reason compression testing was needed to discern the level of thermal damage. Table 2 contains a summary of the compression test results. Specimens from the 0.5 w/c batch that were heated to 550° F. (288° C.) for 36 hrs (and quenched) exhibited a 26% reduction in compression strength as compared to the control specimens. Those specimens that were treated with nanoparticles exhibited a 5% increase in strength compared to the control specimens. When compared to the untreated and heated specimens, the nanoparticle treated specimens exhibited a strength increase of 40%. This work indicated that the nanoparticle treatment, applied to the 0.5 w/c ratio case, provided significant resistance to compressive strength degradation that would otherwise result from this thermal exposure.

A second batch of specimens having 0.4 w/c ratio was also prepared and tested. In this batch, the untreated and heated specimens lost 22% of the compressive strength compared to the control specimens. If the treated and heated specimens were compared with the control specimens, the treated and heated specimens exhibited 66% more strength. Treated and heated specimens exhibited 116% more strength as compared to the untreated and heated specimens.

Normally the lower the w/c ratio the higher the strength of the specimens. Results from Table 3 show that the strength of the control specimens of 0.4 w/c increased by an average value of 4% compared to the 0.5 w/c specimens. In the untreated and heated case the strength of the 0.4 w/c specimens was increased by 7%. For the treated and heated specimens this w/c-related strength increase was 64%. This indicates that by using this nanoparticle treatment the compressive strength of the specimens increases even after severe thermal exposure.

All the specimens cracked after quenching from 550° F. (288° C.). From the outside, both the treated and untreated looked similar. Compressive tests indicated that the thermal cracking may have occurred adjacent to the surface of the specimen but not deep within the core. The core strength may have played a role in restricting the thermal cracking. Quenching caused high thermal gradients on the surface of the both the treated and untreated specimens. Due to these gradients, high thermal stresses were expected on the surface of the specimens. When the thermal stresses exceeded the tensile strength of the specimens then cracking would be expected to occur.

A thermal analysis model was developed using ANSYS (Release 7.0) software to assess the possible extent of thermal cracking induced by quenching. A sequential analysis was done on both treated and untreated specimens for calculating thermal stresses. The thermal analysis results were compared with the experimental results. The properties of both the untreated and treated specimens are presented in Table 3. This table consists of handbook values adapted for constructing a thermal computer model analysis of how the concrete responded to being quenched. The model indicates how far the thermal cracking reaches and this information was used to determine the strength of the uncracked interior referred to as the core region or core strength.

TABLE 3

Properties of Untreated and Treated Specimens

| Properties | Untreated | Treated |
|---|---|---|
| Modulus of Elasticity (GPa) | 26 | 64 |
| Poisson's Ratio | 0.17 | 0.27 |
| Density (kg/m3) | 1770 | 2100 |
| Thermal Conductivity (W/m-K) | 2.8 | 0.14 |
| Specific Heat (J/kg/K) | 950 | 983.9 |
| Coefficient of Thermal Expansion(/K) | 20 × 10-6 | 11.7 × 10-6 |

A plot was made of thermal stresses vs. radial distance from the center towards the outer surface in the untreated case as shown in FIG. 7. A similar plot was developed for the treated case as shown in FIG. 8. These stresses were calculated using ANSYS (finite element software). Thermal stresses were calculated to predict the extent of tensile stresses that could cause cracking on the surface of a specimen. The stress curve plotted assumed no surface cracking but may possibly indicate the depth of surface cracking. The depth of possible surface cracking was indicated by the level of stress which exceeds the typical tensile strength range of 3.6 to 7.2 MPa.

A calculated modulus of elasticity (64 GPa) provided thermal stresses nearer to the tensile strength of the material than was provided using the literature value of 413 GPa. The typical level of tensile strength is in the range of 3.6-7.2 MPa. The stresses obtained were approximately 5 times this stress level. Contrarily when the reported modulus of elasticity (413 GPa) was used for the analysis, the stresses it induced were up to 100 times the tensile strength of the material. Based on these calculations, it appears that the modulus of elasticity had a high positive impact on the stresses calculated in the specimens. In future work, a better estimate of this modulus should be obtained.

The finite element analysis results showed that the temperature gradient was higher for the treated specimens as compared to the untreated specimens. The higher thermal gradient is expected as a result of a low heat transfer rate, but the important thing here is that a higher thermal gradient can provide higher thermal stresses. High displacements in treated specimens were observed as compared to the untreated specimens especially at the outer surface. The elevated coefficient of thermal expansion for the treated cases (~2× higher) is causing high displacements.

The thermal stress profiles due to quenching indicate a high stress state from the surface inward reaching 4 mm for the untreated case and 2 mm for the treated case. Since tensile strengths for these materials typically range from 3.6 MPa to 7.2 MPa, it is not likely that the actual stresses attained these values. Thermal cracking clearly provided a great deal of stress relief adjacent to the surface. Deeper within the specimen cores the model predicted high tensile stresses at or above the material tensile strength range. Since the remaining compressive strengths observed for these heated specimens were fairly high (see Table 2), it is clear that the tensile stresses predicted in the model were not attained. Revisiting the cracked region adjacent to the surface, one may take the 4 mm and 2 mm ranges of predicted high stresses, as demarcations of the beginning of the uncracked core in these cases. FIG. 9 contains an illustration of these cores. These core sizes were used to estimate the remaining core strength.

Thermal analysis results indicated that the crack penetration in the untreated case is up to 4 mm into the surface, whereas in the treated case it is only up to 2 mm. The stress in the core was calculated by taking the product of the apparent diameter stress and apparent diameter area and dividing by the core area. The apparent and core stress values for the untreated and treated cases are presented in Table 4. The estimated core strength of the treated specimens was increased by 17% compared to the case of the 0.5 w/c (the mass ratio of water to cement powder used to create the paste). A high value yields a very porous or weak hardened cement paste and thus a week concrete. 0.5 is considered a moderate value for the w/c ratio.

TABLE 4

Apparent and Core Stress Values

| | 0.5 w/c Ratio | | 0.4 w/c Ratio | |
| --- | --- | --- | --- | --- |
| Case | $S_{app}$ (MPa) | $S_{core}$ (MPa) | $S_{app}$ (MPa) | $S_{ore}$ (MPa) |
| Untreated | 11.7 | 16.5 | 12.5 | 17.6 |
| Treated | 16.4 | 19.3 | 27 | 31.8 |

The impact of the w/c ratio on the response to the nanoparticle treatment was significant. The 0.4 w/c ratio specimens responded with 65% more strength than 0.5 w/c ratio cases. From Table 2, experimental results showed that the compressive strength of the treated specimens after thermal exposure increased an overall average of 70% but the increase in resistance to thermal cracking was not clearly demonstrated.

Furnace test results showed both the treated and untreated specimens cracked at 550° F. (288° C.) following quenching. This work indicated that the nanoparticle treatment, applied to the 0.4 w/c and 0.5 w/c ratio cases, provided significant resistance to compressive strength degradation after thermal exposure. The results showed that there was an increase in compressive strengths at 550° F. (288° C.) for the treated cases. Finite element analysis indicated a crack-inducing tensile stress in untreated specimens up to a 4 mm depth into the surface whereas in the treated case it is only up to 2 mm. The estimated, uncracked core strength of the treated specimens exhibited an average value that was 50% higher than that of the untreated specimens. The Impact of w/c ratio on the response to the nanoparticle treatment was significant with the 0.4-w/c ratio specimens responding with 65% more strength than the 0.5-w/c ratio cases.

I claim:

1. A method of strengthening cementitious concrete comprising:
    a. providing a section of cementitious concrete having a depth;
    b. placing a substantially inorganic nanoparticle carrier liquid in contact with at least a first surface of said concrete section, said substantially inorganic nanoparticle carrier liquid comprising nanoparticles in a colloidal suspension;
    c. inducing a current across said concrete section;
    d. applying said current at sufficient magnitude and for sufficient time that said nanoparticles in said nanoparticle carrier liquid migrate through at least one quarter of said depth of said concrete section.

2. The method according to claim 1, wherein said nanoparticles are chosen from at least one of silica, alumina, silicate, or aluminate.

3. The method according to claim 1, wherein said depth extends from said first surface of said concrete section to at least one second, opposing surface of said concrete section.

4. The method according to claim 1, wherein said current has a density of about 10 to about 1000 mA/ft².

5. The method according to claim 1, wherein said current is applied for at least about 12 hours.

6. The method according to claim 1, wherein said current is induced by a first electrode positioned in contact with said nanoparticle solution.

7. The method according to claim 6, wherein at least one second surface of said section is placed in contact with a conducting liquid and at least one second electrode is positioned in said liquid.

8. The method according to claim 7, wherein said conducting liquid is an electrolyte solution.

9. The method according to claim 6, wherein at least one second electrode is formed by reinforcing metal positioned in said concrete section.

10. The method according to claim 1, wherein said concrete section is in a substantially cured state.

11. The method according to claim 1, wherein said concrete section is in a substantially uncured state.

12. The method according to claim 6, wherein said first electrode is a wire mesh, or conductive fabric, or a fabric rendered conductive via wetting with a conductive medium.

13. The method according to claim 1, wherein a compressive strength of said concrete section is increased by at least about 50 percent.

14. The method according to claim 1, wherein a tensile strength of said concrete section is increased by at least about 25%.

15. The method according to claim 1, wherein a modulus of rupture of said concrete section is increased by at least about 25%.

16. The method according to claim 1, wherein said nanoparticles undergo a pozzolanic reaction within said concrete section.

17. The method according to claim 1, wherein at least one porous material is positioned against said surface of said concrete section and said porous material brings said nanoparticle solution into contact with said concrete section.

18. The method according to claim 17, wherein at least one porous material is positioned against at least one second surface of said concrete section.

19. The method according to claim 18, wherein said porous material is flexible.

20. The method according to claim 19, wherein said flexible, porous material is a sponge.

21. The method according to claim 1, wherein said concrete section is rendered substantially impermeable.

22. The method according to claim 1, wherein said concrete section is a masonry block.

23. The method according to claim 22, wherein said masonry block includes two hollow sections.

24. A strengthened concrete section produced by the steps comprising:
   a. providing a section of cementitious concrete having a depth;
   b. placing a substantially inorganic nanoparticle carrier liquid in contact with at least a first surface of said concrete section, said substantially inorganic nanoparticle carrier liquid comprising nanoparticles in a colloidal suspension;
   c. inducing a current across said concrete section;
   d. applying said current at sufficient magnitude and for sufficient time that said nanoparticles in said nanoparticle carrier liquid migrate through at least one quarter of said depth of said concrete section.

25. The strengthened concrete section of claim 24, wherein said strengthened concrete section is rendered substantially impermeable.

* * * * *